US012580912B2

(12) United States Patent
Layouni et al.

(10) Patent No.: US 12,580,912 B2
(45) Date of Patent: Mar. 17, 2026

(54) SYSTEM AND METHOD FOR TRANSMITTING A MESSAGE IN A COMMUNICATION NETWORK

(71) Applicant: GM GLOBAL TECHNOLOGY OPERATIONS LLC, Detroit, MI (US)

(72) Inventors: Mohamed A. Layouni, Fraser, MI (US); Sherif Aly, West Bloomfield, MI (US); Andrew Naegle, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 18/617,826

(22) Filed: Mar. 27, 2024

(65) Prior Publication Data

US 2025/0310327 A1     Oct. 2, 2025

(51) Int. Cl.
*H04L 69/22*        (2022.01)
*H04L 9/40*         (2022.01)
(52) U.S. Cl.
CPC .......... *H04L 63/0876* (2013.01); *H04L 69/22* (2013.01)
(58) Field of Classification Search
CPC ............................ H04L 63/0876; H04L 69/22
See application file for complete search history.

(56) References Cited

U.S. PATENT DOCUMENTS

| 11,016,926 | B1 | 5/2021 | Nasser et al. | |
| 2019/0207950 | A1 | 7/2019 | Mohammed et al. | |
| 2019/0232969 | A1* | 8/2019 | Jupp | B60W 50/0205 |
| 2022/0094684 | A1 | 3/2022 | Kmedani | |
| 2022/0131839 | A1* | 4/2022 | Potter | G06F 21/85 |
| 2023/0199500 | A1 | 6/2023 | Geng et al. | |
| 2024/0195799 | A1* | 6/2024 | Ramamoorthy | H04L 63/0428 |

FOREIGN PATENT DOCUMENTS

DE        102021116640 A1      1/2022

* cited by examiner

*Primary Examiner* — Frantz B Jean
(74) *Attorney, Agent, or Firm* — Quinn IP Law

(57) ABSTRACT

A system and method for securely transmitting a message within a communication network is described. The system includes a first controller being in communication with a second controller. A freshness value (FV) manager generates a first FV, wherein the first FV is arranged as an N-bit integer. The first controller generates a first message that includes the first FV. The first controller communicates the first message to the second controller. The second controller receives the first message from the first controller, and evaluates the first FV of the first message. The second controller generates an acceptance window, which is defined as a range of N-bit integers between a maximum FV and a minimum FV. The second controller permits further evaluation of the first message when the first FV is within the acceptance window.

20 Claims, 5 Drawing Sheets

SYSTEM AND METHOD FOR TRANSMITTING A MESSAGE IN A COMMUNICATION NETWORK

BACKGROUND

This disclosure relates to a network, and digital communications in a network, such as may be found in a vehicle or a stationary device. A communication network may include a Controller Area Network (CAN), a Local Interconnection Network (LIN), FlexRay, a media oriented systems transport (MOST), Ethernet including automotive Ethernet, and other networks.

One example of a specification for a communication network was developed by AUTomotive Open System ARchitecture (AUTOSAR), which specifies a Secure Onboard Communication (SecOC) information security component and a communication encryption and verification standard for a vehicle communication bus. An AUTOSAR SecOC specification provides an authentication mechanism for an electronic control unit (ECU) message on a message level of a protocol data unit (PDU), to ensure freshness of a PDU message and prevent a message replay attack. An AUTOSAR SecOC specification specifies that a freshness value may use two alternative schemes: timestamp and monotonic counter.

Implementation of a monotonic counter scheme to generate a freshness value may introduce issues with synchronization of the freshness value between a controller that is sending a message and a controller that is receiving the message. A freshness value synchronization process may rely upon factors that are unpredictable or unstable, and timely implementation of periodic synchronization cannot be guaranteed, which may result in occurrence of an unauthorized replay of a message. An unauthorized replay may be the result of an intentional replay by a bad actor, a loss of synchronization on the freshness counter between nodes in the network, or several messages sent close to each other in time and arriving out of order at the receiver side because of unpredictable delays introduced by the network.

A replay attack is a form of an unauthorized access in which a third party captures a legitimate message and subsequently sends the captured message to impersonate the legitimate message, albeit at a different point in time, to gain access to the second controller, with an attendant risk of inappropriate or malicious action by the third party related to operation of the system.

Functional security measures generally relate to defenses incorporated at the edge or internal to a network to block third parties, e.g., intruders or other malicious actors from accessing and carrying out exploits or threats on a network. However, functional security measures add overhead and complexity to systems.

SUMMARY

There is a benefit to having a communication network that has edge-based or internal security measures to block third parties from accessing a network so as to prevent communication of unwanted messages in the communication network. A communication network may include direct-wired communication between devices, wireless communication between devices, and/or bus-based communication between devices. One form of communication of unwanted messages in a communication network includes a replay attack wherein a third party captures a message, and then resends the message at a later point in time.

The disclosure provides, in one embodiment, a system, method, apparatus, and an architecture for securely transmitting a message within a communication network.

The system includes a first controller, a second controller, and a freshness value (FV) manager, with the first controller being in communication with the second controller, the FV manager being operative to generate a first FV associated with the first controller, wherein the first FV is arranged as an N-bit integer, and wherein the first FV is readable by the first controller, the first controller being operative to generate a first message, the first message including the first FV; the first controller being operative to communicate the first message to the second controller; the second controller being operative to generate an acceptance window, wherein the acceptance window is defined as a range of N-bit integers between a maximum FV and a minimum FV; the second controller being operative to receive the first message from the first controller; and the second controller being operative to evaluate the first FV of the first message. The second controller is operative to permit further evaluation of the first message when the first FV is within the acceptance window.

Another aspect of the disclosure may include the second controller being operative to discard the first message when the first FV is outside the acceptance window.

Another aspect of the disclosure may include the second controller being operative to discard the first message when the first FV is equal to a previously received FV.

Another aspect of the disclosure may include the first controller being operative to generate a message authenticator (MAC), wherein the first message includes the MAC and the first FV; wherein the second controller is operative to verify the MAC; and wherein the second controller is operative to accept the first message when the first FV is within the acceptance window and when the MAC has been verified.

Another aspect of the disclosure may include the second controller being operative to discard the first message when either the first FV is outside the acceptance window or when the MAC has not been verified.

Another aspect of the disclosure may include the second controller being operative to: determine that the first FV is greater than the maximum FV of the acceptance window; verify the MAC; and accept the first message when the first FV is greater than the maximum FV of the acceptance window and the MAC has been verified.

Another aspect of the disclosure may include the second controller being operative to update the acceptance window when the first FV is greater than the maximum FV of the acceptance window and the MAC has been verified.

Another aspect of the disclosure may include the second controller being operative to update the acceptance window comprises the second controller being operative to update the maximum FV of the acceptance window to be equal to the FV term of the received message, and update the minimum FV of the acceptance window based upon the maximum FV and the range of N-bit integers.

Another aspect of the disclosure may include the first controller being in communication with the second controller via one of a direct wired point-to-point link, a networked communication bus link, or a wireless link.

Another aspect of the disclosure may include the N-bit integer generated by the FV manager being monotonically increased.

Another aspect of the disclosure may include the second controller being operative to permit further evaluation of the first message when the first FV is within the acceptance window comprises the second controller being operative to permit further evaluation of the first message when the first FV is greater than the minimum FV.

Another aspect of the disclosure may include a system for receiving a message that includes a second controller, the second controller in communication with a first controller. The second controller is operative to generate an acceptance window, wherein the acceptance window is defined as a range of N-bit integers between a maximum freshness value (FV) and a minimum FV; receive a first message from the first controller, wherein the first message includes a first FV, wherein the first FV is arranged as an N-bit integer that monotonically increases; evaluate the first FV of the first message; and permit further evaluation of the first message when the first FV is within the acceptance window.

Another aspect of the disclosure may include the second controller being operative to discard the first message when the first FV is outside the acceptance window.

Another aspect of the disclosure may include the second controller being operative to discard the first message when the first FV is equal to a previously received FV.

Another aspect of the disclosure may include a message authenticator (MAC), wherein the MAC is generated by the first controller and the first message includes the MAC and the first FV. The second controller is operative to authenticate the first message based upon the MAC; and accept the first message when the first FV is within the acceptance window and when the MAC has been verified.

Another aspect of the disclosure may include the second controller being operative to discard the first message when either the first FV is outside the acceptance window or when the MAC has not been verified.

Another aspect of the disclosure may include the second controller being operative to permit further evaluation of the first message when the first FV is greater than the minimum FV.

Another aspect of the disclosure may include the second controller being operative to: determine that the first FV is greater than the maximum FV of the acceptance window; verify the MAC; accept the first message when the first FV is greater than the maximum FV of the acceptance window and the MAC has been verified; and update the acceptance window when the first FV is greater than the maximum FV of the acceptance window and the MAC has been verified, including the second controller being operative to update the maximum FV of the acceptance window to be equal to the first FV of the received message, and update the minimum FV of the acceptance window based upon the maximum FV and the range of N-bit integers.

Another aspect of the disclosure may include a method for transmitting a message. The method includes: generating, via freshness value (FV) manager, a first FV, wherein the first FV is arranged as an N-bit integer, and wherein the first FV is readable by a first controller; generating, via the first controller, a message authenticator (MAC); generating, via the first controller, a first message, the first message including the first FV and the MAC; communicating the first message to a second controller; generating an acceptance window, wherein the acceptance window is defined as a range of N-bit integers between a maximum FV and a minimum FV; receiving, via the second controller, the first message; evaluating, via the second controller, the first FV of the first message; verifying, via the second controller, the MAC; authenticating, via the second controller, the first message based upon the MAC and the first FV; accepting the first message when the first FV is within the acceptance window and when the MAC has been verified; and discarding, by the second controller, the first message when either the first FV is outside the acceptance window or when the MAC has not been verified.

The above summary is not intended to represent every possible embodiment or every aspect of the present disclosure. Rather, the foregoing summary is intended to illustrate some of the aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
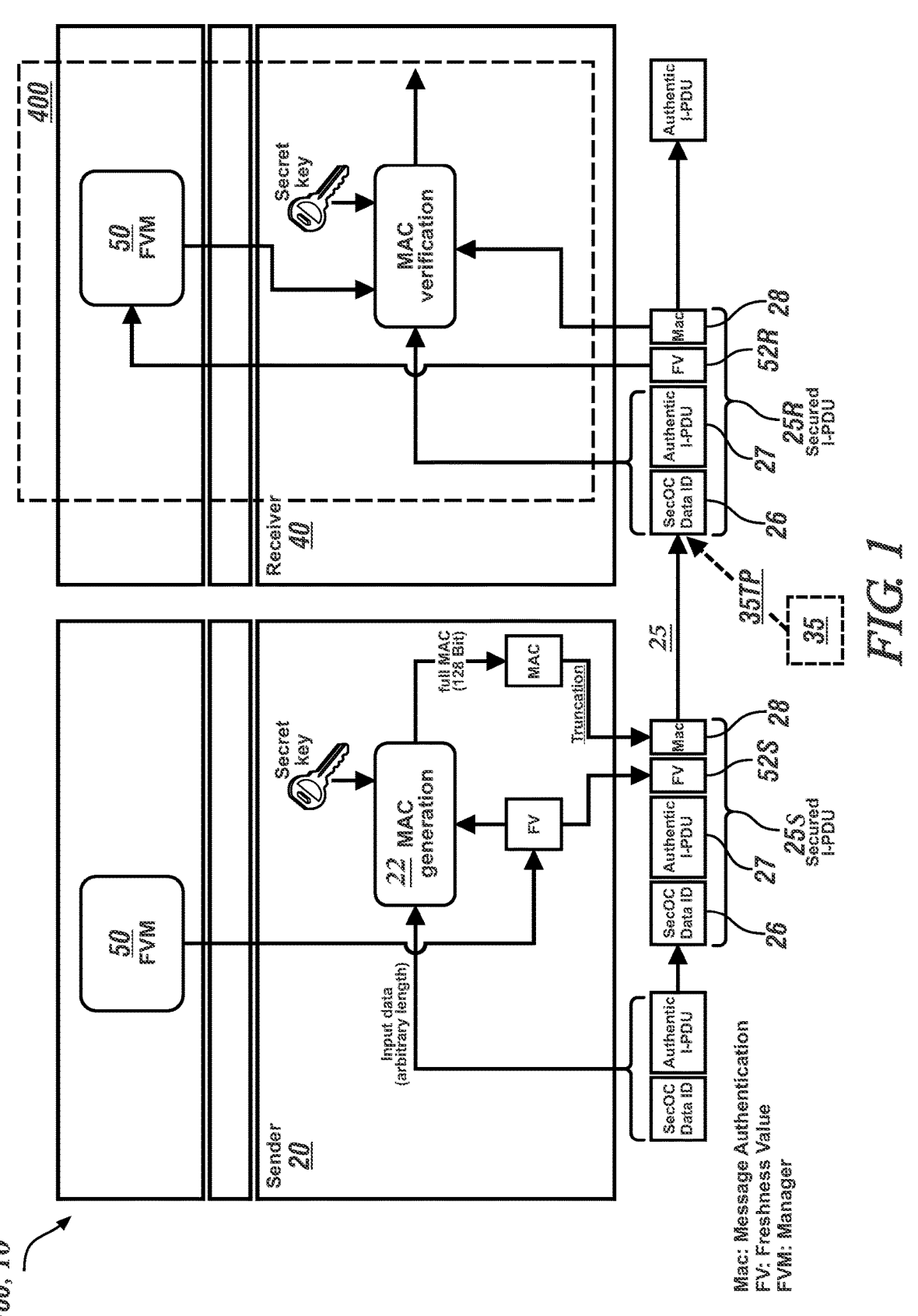
FIG. 1 schematically illustrates a non-limiting embodiment of a system for transmitting an electronic message between a sending controller and a receiving controller that are arranged in a network, in accordance with the disclosure.

The appended drawings are in simplified form and are not to precise scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The use of ordinals such as first, second and third does not necessarily imply a ranked sense of order, but may distinguish between multiple instances of an act or structure.

The following detailed description is merely illustrative in nature and is not intended to limit the application and uses. Furthermore, there is no intention to be bound by an expressed or implied theory presented herein. Throughout the drawings, corresponding reference numerals indicate like or corresponding elements and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Illustrated embodiments may be described herein in terms of functional and/or logical block components and various processing steps. It should be appreciated that such block components may be realized by a number, combination or collection of mechanical and electrical hardware, software, and/or firmware components operative to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the embodiments may be practiced in conjunction with mechanical and/or electronic systems, and that the vehicle systems described herein are merely illustrative of possible implementations.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

Except in the examples, or where otherwise expressly indicated, numerical quantities in this description indicating amounts of material or conditions of reaction and/or use are to be understood as modified by the word "about" in describing the broadest scope of the disclosure. Also, unless expressly stated to the contrary: percent, "parts of," and ratio values are by weight; the description of a group or class of materials as suitable or preferred for a given purpose in connection with the disclosure implies that mixtures of two or more of the members of the group or class are equally suitable; the first definition of an acronym or other abbreviation applies to subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this disclosure is not limited to the specific embodiments and methods described below, as specific components and/or conditions may, of course, vary. Furthermore, the terminology used herein is used for the purpose of describing particular embodiments of the present disclosure and is not intended to be limiting.

It is also noted that, as used in the specification and the appended claims, the singular form "a," "an," and "the" comprise plural referents unless the context clearly indicates otherwise. For example, reference to a component in the singular is intended to comprise a plurality of components.

Referring now to the drawings, wherein the depictions are for the purpose of illustrating certain embodiments and not for the purpose of limiting the same, FIG. 1 schematically illustrates a non-limiting embodiment of a system 100 for transmitting an electronic message between a sending controller 20 and a receiving controller 40 that are arranged in a network 10. The system 100 employs a Freshness Value (FV) and a Message Authentication Code (MAC) to verify freshness, integrity, and authenticity of a received electronic message. The purpose of such an arrangement is to verify that the received message 25R in the receiving controller 40 originates from the sending controller 20, is timely, and has the correct value, i.e., reflects the sent message 25S. This verification of the freshness, integrity, and authenticity of the received message 25R reduces or eliminates the likelihood of third party access to the network 10.

The network 10 is composed of at least two controllers that communicate messages therebetween to perform a function. For purposes of simplification of the description, the two controllers are referred to herein as a sending controller 20 and a receiving controller 40.

The term "controller" and related terms such as control module, module, control, control unit, processor and similar terms refer to one or various combinations of Application Specific Integrated Circuit(s) (ASIC), electronic circuit(s), central processing unit(s), microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link, or another suitable communication link. Communication includes exchanging data signals in suitable form, including, for example, electrical signals via a conductive medium, electromagnetic signals via air, optical signals via optical waveguides, and the like. The data signals may include discrete, analog, or digitized analog signals representing inputs from sensors, actuator commands such as transistor gate drivers, and communication between controllers. The term "signal" refers to a physically discernible indicator that conveys information, and may be a suitable waveform (e.g., electrical, optical, magnetic, mechanical, or electromagnetic), such as DC, AC, sinusoidal-wave, triangular-wave, square-wave, vibration, and the like, that is capable of traveling through a medium.

By way of a non-limiting example, when the network 10 is deployed on-vehicle, the sending controller 20 may be a brake pedal controller and the receiving controller 40 may be a brake actuator controller, and the electronic message may be a braking force command that is communicated to the brake actuator controller based upon an operator input to a brake pedal, which is input to the brake pedal controller. As appreciated, freshness, integrity, and authenticity of a braking force command are imperative to proper operation of a vehicle.

Figure 2:
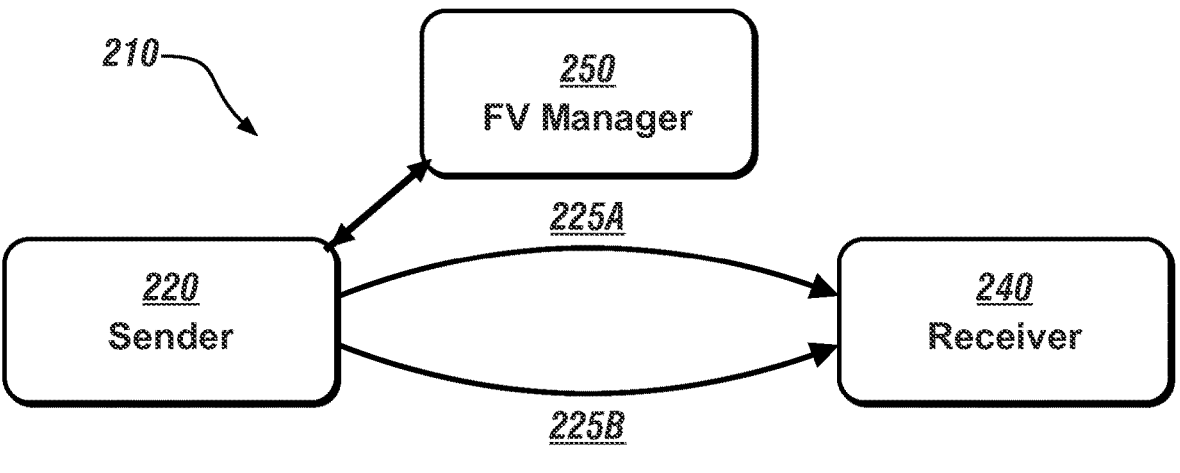
FIG. 2 schematically illustrates an embodiment of a network that includes a single sending controller, a receiving controller, and a freshness value (FV) manager, in accordance with the disclosure.
Figure 3:
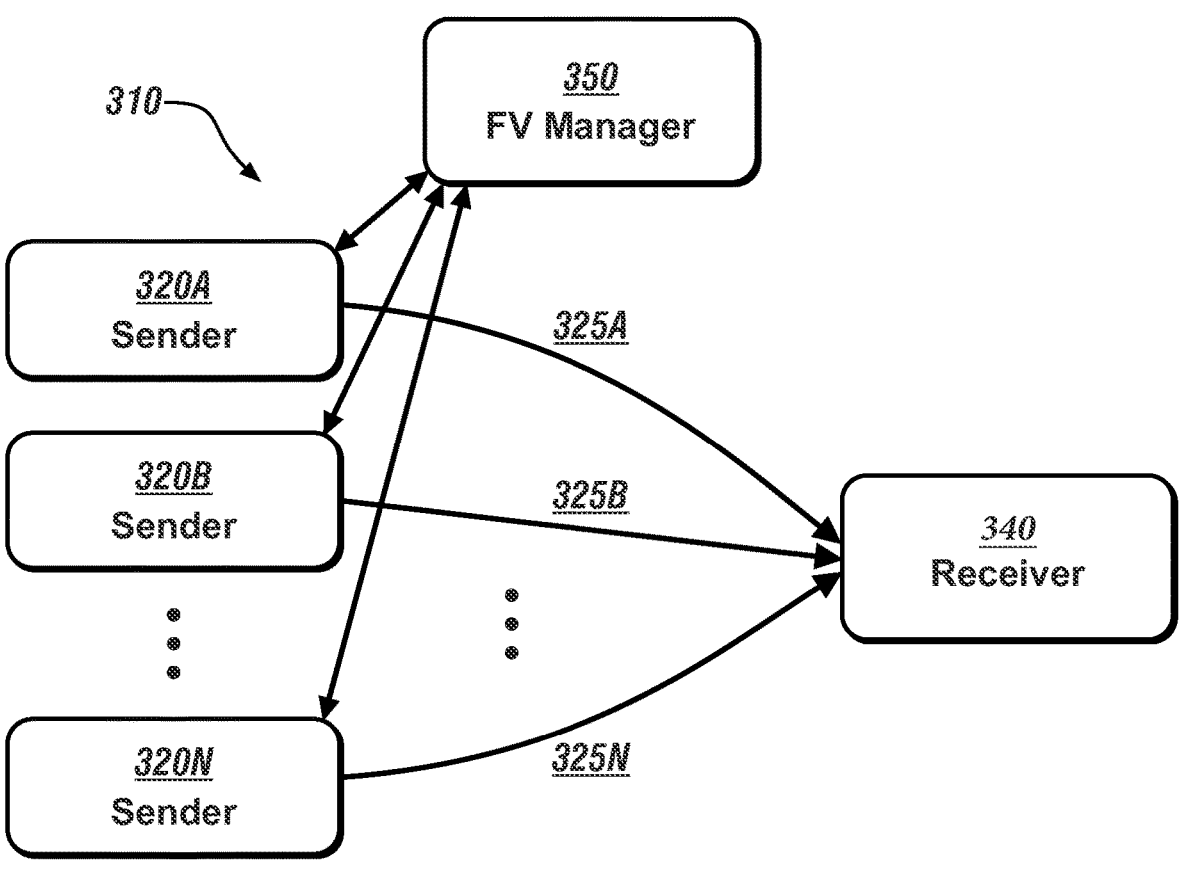
FIG. 3 schematically illustrates an embodiment of a network that includes multiple controllers including a plurality of sending controllers, a receiving controller, and a freshness value (FV) manager, in accordance with the disclosure.

FIG. 2 schematically illustrates an embodiment of the network 210 having two controllers that include a sending controller 220 and a receiving controller 240. FIG. 3 schematically illustrates an embodiment of the network 310 having multiple controllers, including a plurality of sending controllers 220 and a single receiving controller 240.

Referring again to FIG. 1, there is illustrated the sending controller 20, the receiving controller 40, and an FV manager 50.

The sending controller 20 includes a MAC generator 22 to generate a MAC 28, which is employed by the receiving controller 40 to authenticate a received message 25R. The MAC generator 22, MAC 28, and related elements and processes are known to those skilled in the art.

The FV manager 50 generates a freshness value (FV) 52S for a Freshness Value Identification term (FV ID) associated with a transmitter of the sending controller 20. In one embodiment, the FV 52S is an N-bit integer that increases monotonically by action of the FV manager 50 for the FV ID. The sending controller 20 includes a transmitter that has one FV ID assigned to it. Each time the transmitter wants to send a message, it asks the FV manager 50 for the latest FV for that FV ID, which is the transmitter's assigned FV ID. The FV manager 50 provides that FV value and then increments the FV counter for that FV ID. On the receiver side, the FV ID is inferred from the received message type and other information such as the MAC or IP address included in the received packet.

Alternatively, the FV 52S may be an N-bit integer that decreases monotonically by action of the FV manager 50. The purpose of the FV 52S is to ensure freshness of the message 25, by permitting detection of a replay of an old message, such as may be sent by a third-party that has gained unauthorized access to the receiving controller 40.

The first or sent message 25S includes a header 26, a payload 27, the FV 52S, and the MAC 28.

The header 26 may include information related to routing, transport, remote direct memory access (RDMA), etc.

The payload 27 is the portion of the transmitted data that is the actual intended message.

The receiving controller 40 captures the received message 25R. The received message 25R may be the sent message 25S from the sending controller 20. The received message 25R may instead be an unauthorized replayed message 35TP originating from a third party controller 35. The unauthorized replayed message 35TP may be the result of an intentional replay by a bad actor, wherein the original message was generated by a legitimate sender and captured by a third party who has subsequently resent it to the receiver after having gained access.

The second or received message 25R includes header 26, payload 27, FV 52R, and MAC 28. In an ideal world, the received message 25R is an exact duplicate of the timely sent message 25S. However, message verification is necessary to verify the freshness, integrity, and authenticity of the received message 25R, to ensure that the received message 25R is not the replayed message 35TP.

When messages are delivered out of order to the receiving controller 40, for whatever reason, a simple FV may not distinguish between a legitimately delayed message originating from the sending controller 20 (e.g., sent message 25S) and a replayed message originating from a third party (e.g., replayed message 35TP). This may happen, for example, in service-oriented communication where many messages are sent asynchronously and/or in parallel by the same sending controller 20.

FIG. 2 schematically illustrates an embodiment of the network 210 having two controllers that include a single sending controller 220, a receiving controller 240, and an FV manager 250. The single sending controller 220 may send two messages to the single receiving controller 240 at or near the same point in time, including first message 225A having a first FV and second message 225B having a second FV that is greater than the first FV. Due to communication delays, such as operation of an Ethernet network, the first message 225A may arrive at the receiving controller 240 after the second message 225B, with the later-received first FV being less than the earlier-received second FV, but with the first message 225A still being a valid and acceptable message for the receiving controller 240. The use of the acceptance window (AW) facilitates receipt and acceptance of both the first and second messages 225A, 225B by verifying the freshness of the first message 225A so long as the first FV is within the acceptance window.

FIG. 3 schematically illustrates an embodiment of the network 310 having multiple controllers, including a plurality of sending controllers, illustrated as 320A, 320B, . . . 320N, with the same FV ID, as described. The plurality of sending controllers 320A, 320B, . . . 320N are sending corresponding messages 325A, 325B, . . . 325N to a receiving controller 340. A single FV manager 350 is also illustrated. The plurality of sending controllers 320A, 320B, . . . 320N, send the corresponding plurality of messages 325A, 325B, . . . 325N to the receiving controller 340 at or about the same time, with FVs that are generated in order of request to the FV manager 350. However, the messages 325A, 325B, . . . 325N are received in a different order than the original order of request. The plurality of messages 325A, 325B, . . . 325N may still be determined to be authentic and timely based upon the FVs, and thus be valid and acceptable for the receiving controller 340 so long as the respective FVs are within the acceptance window. Thus, the use of the acceptance window facilitates receipt of the plurality of messages 325A, 325B, . . . 325N by verifying the FVs of the received plurality of messages 325A, 325B, . . . 325N so long as the respective FVs are within the acceptance window. Each of the received plurality of messages 325A, 325B, . . . 325N still requires verification of the respective MAC prior to authentication and acceptance thereof.

Figure 4:
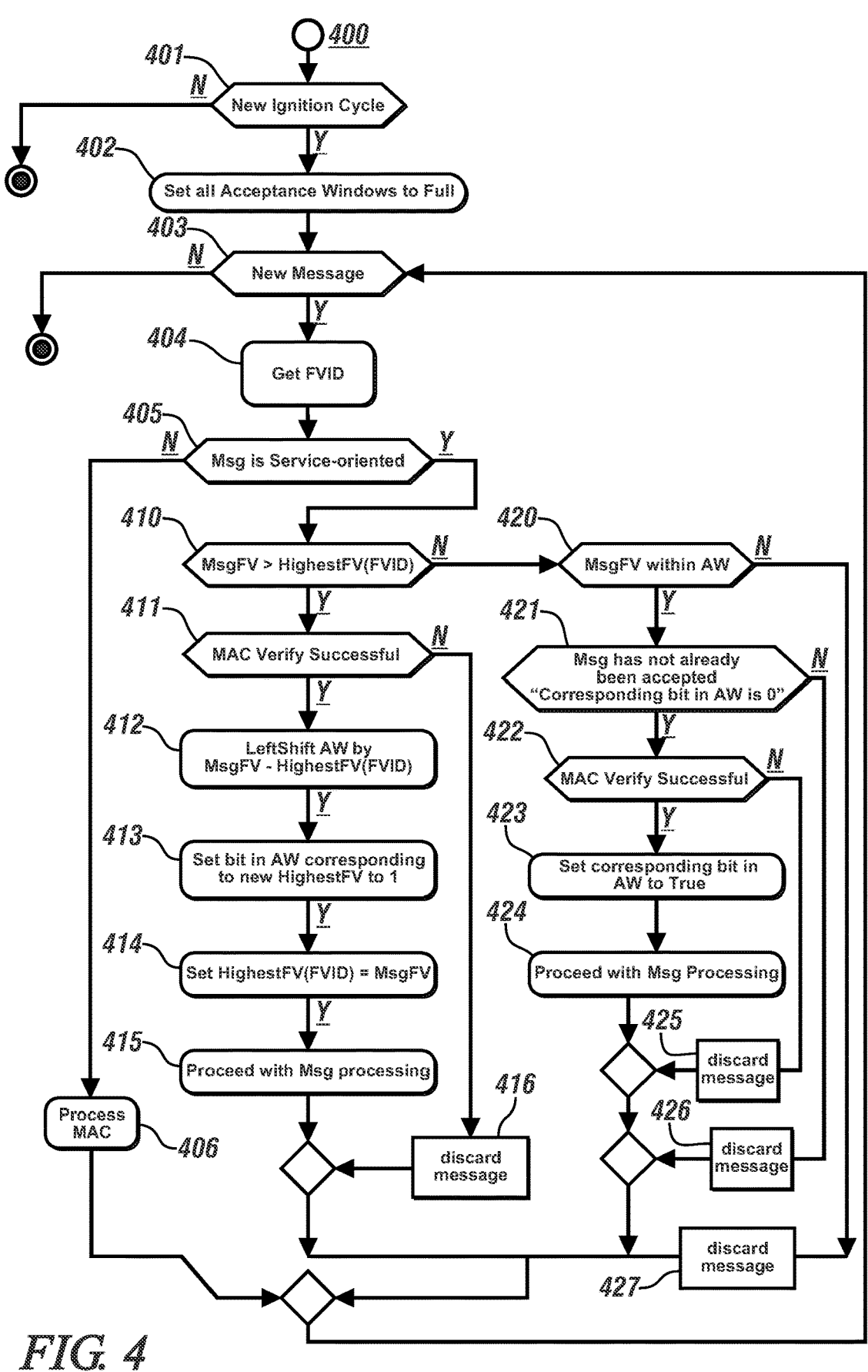
FIG. 4 schematically illustrates a message validation routine in the form of a flowchart, in accordance with the disclosure.

FIG. 4, with continued reference to the system 100 described with reference to FIG. 1, schematically illustrates a routine 400, in the form of a flowchart, for evaluating elements of the received message 25R, including the FV 52R and the MAC 28 prior to reading, accepting, implementing, discarding, or otherwise acting on the received payload 27.

Elements of the received message 25R, including the FV 52R and the MAC 28, are evaluated upon transmission to the receiving controller 40, prior to accepting, implementing, and/or otherwise acting on the payload 27. The receiving controller 40 will discard the received message 25R unless the received FV 52R satisfies an acceptance window (AW) defined in the receiving controller 40 and the MAC 28 is verified by the receiving controller 40. Stated differently, the receiving controller 40 will accept and act upon the received message 25R only when the received FV 52R satisfies the acceptance window (AW) defined in the receiving controller 40, the received FV 52R has not been previously received, and the MAC 28 is verified by the receiving controller 40. Stated differently, the receiving controller 40 will discard the received message 25R when the received FV 52R falls outside the acceptance window (AW) defined in the receiving controller 40 or the MAC 28 is not verified by the receiving controller 40. As such, the receiving controller 40 will discard the received message 25R when the received FV 52R is less than a lower bound of the acceptance window (AW) defined in the receiving controller 40.

The use of an Acceptance Window that is dynamically updated by the receiving controller 40 permits continued evaluation by MAC verification of a message that is received out of order so long as it falls inside the acceptance window and the FV has not been previously received.

The message validation routine 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the message validation routine 400 is described with reference to the system 100 shown in FIG. 1. Table 1 is provided as a key wherein the numerically labeled blocks and the corresponding functions are set forth as follows, corresponding to the message validation routine 400.

TABLE 1

| BLOCK | BLOCK CONTENTS |
|---|---|
| 401 | New Operating Cycle? |
| 402 | Initialize Acceptance Window |
| 403 | New message received? |
| 404 | Retrieve MsgFV |
| 405 | Service-Oriented Message? |
| 406 | Process MAC |
| 410 | Is MsgFV > HighestFV(FVID) |
| 411 | MAC verified? |
| 412 | Left shift AW by MsgFV - HighestFV(FVID) |
| 413 | Set bit in AW corresponding to new HighestFV(FVID) to 1 |
| 414 | Set HighestFV(FVID) = MsgFV |
| 415 | Process Msg |
| 416 | Discard message |
| 420 | Is MsgFV within AW? |
| 421 | Has Message already been received and accepted? |
| 422 | MAC verified? |
| 423 | Set corresponding bit in AW to 1 |
| 424 | Process Msg |
| 425 | Discard Message |
| 426 | Discard Message |
| 427 | Discard message |

The message validation routine 400 is advantageously executed in the receiving controller 40. Execution of the message validation routine 400 may proceed as follows. The steps of the routine 400 may be executed in a suitable order, and are not limited to the order described with reference to FIG. 4. As employed herein, the term "Y" indicates an answer in the affirmative, or "YES" or "TRUE", and the term "N" indicates an answer in the negative, or "NO" or "FALSE".

Execution of the message validation routine 400 begins each operating cycle of the system (401)(Y), such as may occur by powering on the system 100. When the system 100 is employed on a vehicle, execution of the routine 400 begins with a key-on event or another command to begin vehicle operation.

During or after powering on the system 100, the message validation routine 400 initializes the acceptance windows (AW) (402), which may include setting the acceptance windows to a full state (all bits of the acceptance window encoding are set to "1"), and waiting to receive a message via a CAN link, a wireless link, a direct link, or another link. As such, as start of the present operating cycle, no messages from a previous operating cycle are accepted, regardless of MAC authenticity, etc. Stated differently, all messages from a previous operating cycle are discarded.

When a message is received by the receiving controller 40 (403(Y)), the FV term (MsgFV) is retrieved therefrom (404), and the received message is evaluated to determine if it is a service-oriented message (405).

When the received message is not a service-oriented message (405)(N), the MAC is processed immediately (406), and this iteration of the message validation routine 400 is ended, awaiting receipt of another incoming message (403).

When the received message is a service-oriented message (405)(Y), the FV of the received message (MsgFV) is evaluated in context of the acceptance window (410, et. seq.). The acceptance window is defined as a range of N-bit integers between a maximum FV and a minimum FV, and thus defines an acceptance window width. The system is pre-configured with the acceptance window width, with the magnitude of the acceptance window width being predefined as a range of bit counts. As such, the acceptance window width is neither time-based nor time-dependent. The upper bound of the acceptance window width, i.e., maximum FV, is equal to the highest FV received so far in a message that has a valid MAC. The lower bound of the range, i.e., minimum FV, is set equal to the maximum FV less the acceptance window width plus 1 bit. In one embodiment, the acceptance window is composed in software as a bit mask, and includes the maximum FV and the minimum FV, wherein the most significant bit of the mask corresponds to the maximum FV, and the least significant bit of the mask corresponds to the minimum FV. Moreover, the value of each bit in the mask indicates whether the corresponding FV has been received and accepted if the bit is set to 1, and the opposite if the bit is set to 0. The maximum FV represents the greatest value for the FV that has been sent to the receiving controller 40 from a previously authenticated message.

When the FV term of the received message (MsgFV) is greater than the maximum or highest FV of the acceptance window (410)(Y), the MAC is subjected to verification (411).

When the MAC cannot be verified (411)(N), the received message is discarded (416), and this iteration of the message validation routine 400 is ended, awaiting receipt of another incoming message (403).

When the MAC can be verified (411)(Y), the acceptance window is updated so that the maximum or highest FV of the acceptance window is set equal to the FV term of the received message (MsgFV). This includes N-bit integer that composes the acceptance window being subjected to a logical left-shift event, i.e., being incremented by an amount that is equivalent to a difference between the FV term of the received message (MsgFV) and the maximum or highest FV of the acceptance window (412). The bit in the acceptance window corresponding to the new maximum or highest FV is set to "1", (413) and the maximum FV of the acceptance window (HighestFV(FVID)) is set to the FV term of the received message (MsgFV) (414). The payload portion of the received message 25R is processed (415), and this iteration of the message validation routine 400 is ended, awaiting receipt of another incoming message (403).

When the FV term of the received message (MsgFV) is equal to or less than the maximum or highest FV (410)(N), the FV term of the received message (MsgFV) is compared to the minimum or lowest FV of the acceptance window (420).

When the FV term of the received message (MsgFV) is less than the minimum or lowest FV of the acceptance window (420)(N), the received message is discarded (427), and this iteration of the message validation routine 400 is ended, awaiting receipt of another incoming message (403).

When the FV term of the received message (MsgFV) is greater than the minimum or lowest FV of the acceptance window (420)(Y), the received message is evaluated to determine if the received message had been previously sent and accepted by the receiving controller (421).

When the received message had been previously sent and accepted (421)(N), the received message is discarded (427), and this iteration of the message validation routine 400 is ended, awaiting receipt of another incoming message (403).

At this point, the MAC is subjected to verification (422).

When the MAC cannot be verified, i.e., does not pass a verification step (422)(N), the received message is discarded (425), and this iteration of the message validation routine 400 is ended, awaiting receipt of another incoming message (403).

When the MAC passes verification (422)(Y), the corresponding bit in the bit mask that composes the acceptance window is set to "1", (413). The payload portion of the received message 25R is processed (424), and this iteration of the message validation routine 400 is ended, awaiting receipt of another incoming message (403).

FIGS. 5 through 9 illustrate various use scenarios that are described with reference to the message validation routine 400 that is described with reference to FIG. 4, and associated with the concept of an embodiment of the acceptance window (AW) that may be employed with a freshness value (FV) that is composed as an N-bit integer that monotonically increases, wherein the acceptance window is implemented in the receiving controller 40 to evaluate an incoming or received message 25R.

Figures 5, 6, 7, 8:
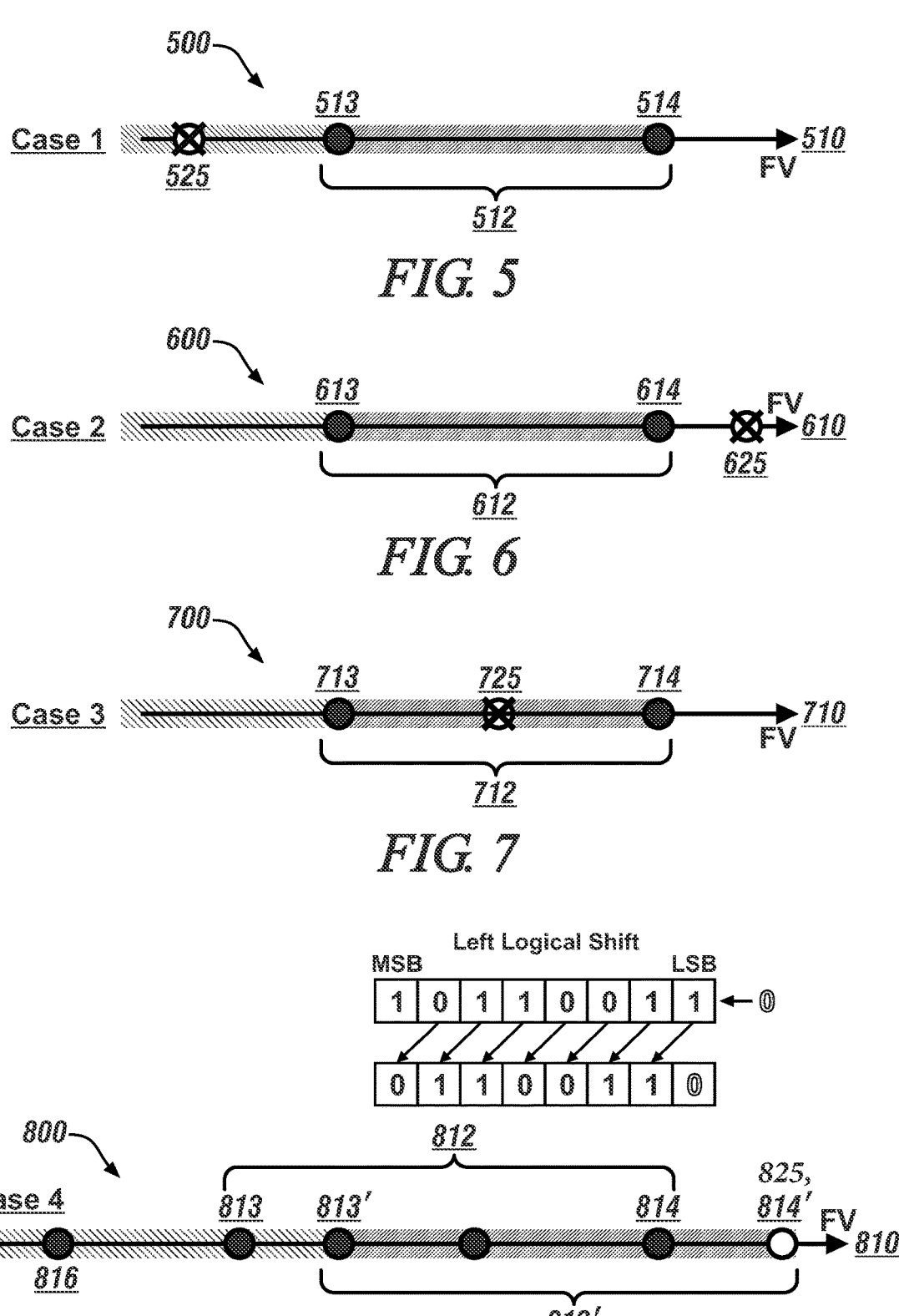
FIGS. 5 through 9 schematically illustrate various use scenarios that are described with reference to the message validation routine of FIG. 4, in accordance with the disclosure.

FIG. 5 illustrates, with continued reference to FIGS. 1 and 4, an embodiment 500 depicting the acceptance window (AW) 512 that may be employed in the message validation routine 400, wherein the acceptance window 512 is implemented in the receiving controller 40 to evaluate an incoming or received message. Line 510 depicts a monotonically increasing FV, with FV acceptance window 512, wherein the FV is composed as an N-bit integer. The FV acceptance window 512 is composed as a range of values between a minimum FV 513 and a maximum FV 514, wherein the maximum FV 514 represents the greatest value for the FV that has been sent to the receiving controller 40.

In this scenario, the message has a FV 525 that is less than the minimum FV 513 that is associated with the FV acceptance window 512. Therefore, the incoming message associated with the FV 525 is discarded. This action is achieved by execution of steps 404, 405, 410, 420, and 427 of the message validation routine 400 of FIG. 4.

FIG. 6 illustrates, with continued reference to FIGS. 1 and 4, an embodiment 600 depicting the acceptance window (AW) 612 that may be employed in the message validation routine 400, wherein the acceptance window 612 is implemented in the receiving controller 40 to evaluate an incoming or received message. Line 610 depicts a monotonically increasing FV, with FV acceptance window 612, wherein the FV is composed as an N-bit integer. The FV acceptance window 612 is composed as a range of values between a minimum FV 613 and a maximum FV 614, wherein the maximum FV 614 represents the greatest value for the FV that has been sent to the receiving controller 40.

In this scenario, the message has an FV 625 that is greater than the maximum FV 614 that is associated with the FV acceptance window 612. However, the MAC contained in the message does not pass verification. Therefore, the incoming message associated with the FV 625 is discarded. This action is achieved by execution of steps 404, 405, 410, 411, and 416 of the message validation routine 400 of FIG. 4.

FIG. 7 illustrates, with continued reference to FIGS. 1 and 4, an embodiment 700 depicting the acceptance window (AW) 712 that may be employed in the message validation routine 400, wherein the acceptance window 712 is implemented in the receiving controller 40 to evaluate an incoming or received message. Line 710 depicts a monotonically increasing FV, with FV acceptance window 712, wherein the FV is composed as an N-bit integer. The FV acceptance window 712 is composed as a range of values between a minimum FV 713 and a maximum FV 714, wherein the maximum FV 714 represents the greatest value for the FV that has been sent to the receiving controller 40.

In this scenario, the message has an FV 725 that is greater than the minimum FV 713 and less than the maximum FV 714 that are associated with the FV acceptance window 712. However, the incoming message associated with the FV 725 has been marked as already having been received, and is thus discarded to prevent a replay attack. This action is achieved by execution of steps 404, 405, 410, 420, 421, and 426 of the message validation routine 400 of FIG. 4.

FIG. 8 illustrates, with continued reference to FIGS. 1 and 4, an embodiment 800 depicting the acceptance window (AW) 812 that may be employed in the message validation routine 400, wherein the acceptance window 812 is implemented in the receiving controller 40 to evaluate an incoming or received message. Line 810 depicts a monotonically increasing FV, with base FV acceptance window 812, wherein the FV is composed as an N-bit integer. The base FV acceptance window 812 is composed as a range of values between base minimum FV 813 and a base maximum FV 814, wherein the base maximum FV 814 represents the greatest value for the FV that has been sent to the receiving controller 40 up until this point in time.

In this scenario, the message has an FV 825 that is greater than the base maximum FV 814 that is associated with the FV acceptance window 812. In this case, the MAC contained in the message has passed verification. As a result, the payload portion of the received message is accepted and processed. Furthermore, the bit-mask that composes the acceptance window is subjected to a logical left-shift event, i.e., is incremented by an amount that is equivalent to a difference between the FVID term of the received message (MsgFV) and the maximum or highest FV, and the bit in the acceptance window corresponding to the new maximum or highest FV is set to "1", to prevent a replay attack. The maximum FV of the acceptance window (HighestFV (FVID)) is set to the FVID term of the received message (MsgFV), which is illustrated as updated maximum FV 814', with the corresponding updated minimum FV 813'. The updated maximum FV 814' and the updated minimum FV 813', which define the metes and bounds of an updated acceptance window 812'. Messages with FVs that are less than the updated minimum FV 813', such as messages having FVs 813 and 816, are no longer tracked, and are no longer acceptable. This action is achieved by execution of steps 404, 405, 410, 411, 412, 413, 414, and 415 of the message validation routine 400 of FIG. 4.

Figures 9, 10:
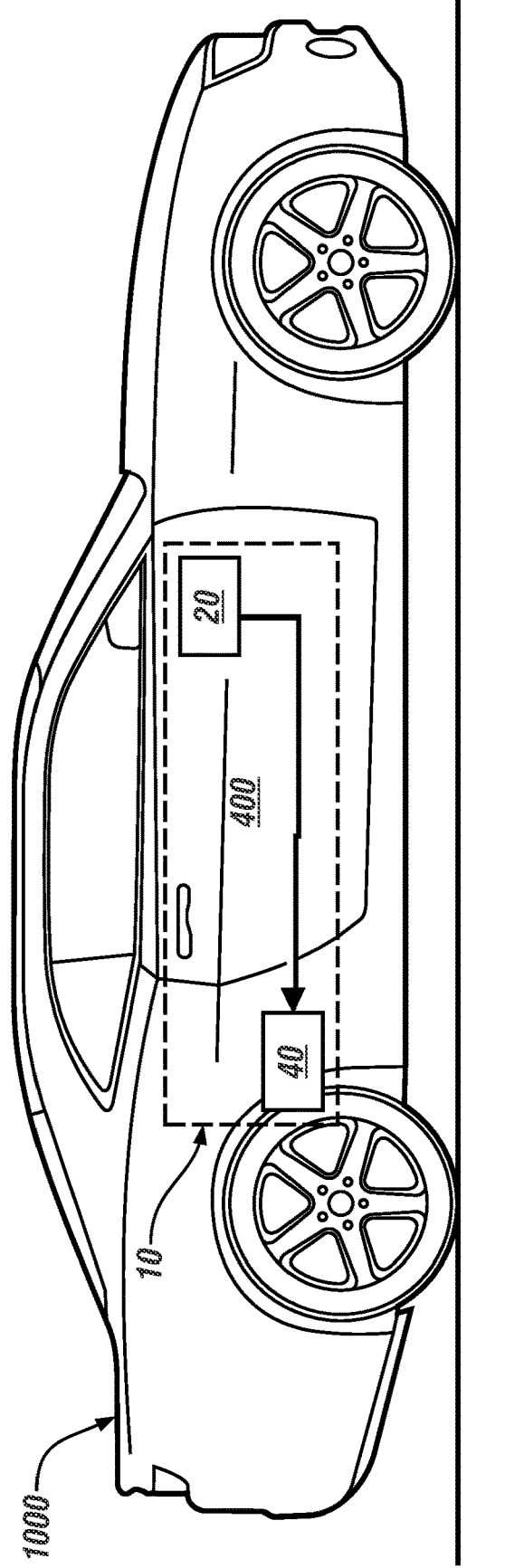
FIG. 10 pictorially illustrates a side view of a vehicle that is disposed on a road surface, in accordance with the disclosure.

FIG. 9 illustrates, with continued reference to FIGS. 1 and 4, an embodiment 900 depicting the acceptance window (AW) 912 that may be employed in the message validation routine 400, wherein the acceptance window 912 is implemented in the receiving controller 40 to evaluate an incoming or received message. Line 910 depicts a monotonically increasing FV, with FV acceptance window 912, wherein the FV is composed as an N-bit integer. The FV acceptance window 912 is composed as a range of values between a minimum FV 913 and a maximum FV 914, wherein the maximum FV 914 represents the greatest value for the FV that has been sent to the receiving controller 40.

In this scenario, the message has an FV 925 that is greater than the minimum FV 913 and less than the maximum FV 914 that are associated with the FV acceptance window 912. Furthermore, the incoming message associated with the FV 925 has not been marked as having already been received. Furthermore, the MAC contained in the message has been verified. As a result, the payload portion of the received message is accepted and processed, with the corresponding bit in the acceptance window set to "1" or true to prevent a replay attack using the message at a later point in time. This action is achieved by execution of steps 404, 405, 410, 420, 421, 422, 423, 424, and 426 of the message validation routine 400 of FIG. 4.

FIG. 10, consistent with embodiments disclosed herein, illustrates elements of a vehicle 1000 on which an embodiment of the network 10 with the message validation routine 400 are deployed. The vehicle 1000 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. It is appreciated that the concepts described herein may be employed on both vehicle systems and stationary systems.

By way of a non-limiting example, when the network 10 is deployed on-vehicle, the sending controller 20 may be a brake pedal controller and the receiving controller 40 may be a brake actuator controller, and the electronic message may be a braking force command that is communicated to the brake actuator controller based upon an operator input to a brake pedal, which is input to the brake pedal controller. As appreciated, freshness and authenticity of a braking force command are imperative to proper operation of a vehicle, including commanding actuation of a brake actuator controller to effect vehicle braking only when braking is commanded via the brake pedal controller in response to input from an operator or an advanced driver assistance system (ADAS).

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A system for transmitting a message, the system comprising:

a first controller, a second controller, and a freshness value (FV) manager;

the first controller being in communication with the second controller;

the FV manager being operative to generate a first FV associated with the first controller, wherein the first FV is arranged as an N-bit integer, and wherein the first FV is readable by the first controller;

the first controller being operative to generate a message authenticator (MAC);

the first controller being operative to generate a first message, the first message including the first FV and the MAC;

the first controller being operative to communicate the first message to the second controller;

the second controller being operative to generate an acceptance window, wherein the acceptance window is defined as a range of N-bit integers between a maximum FV and a minimum FV;

the second controller being operative to receive the first message from the first controller; and the second controller being operative to evaluate the first FV of the first message;

the second controller being operative to authenticate the first message based upon the MAC and the first FV; and wherein the second controller is operative to permit further evaluation of the first message when the first FV is within the acceptance window.

2. The system of claim 1, further comprising the second controller being operative to discard the first message when the first FV is outside the acceptance window.

3. The system of claim 1, further comprising the second controller being operative to discard the first message when the first FV is equal to a previously received FV.

4. The system of claim 1, further comprising;

wherein the first message includes the MAC and the first FV;

wherein the second controller is operative to verify the MAC; and wherein the second controller is operative to accept the first message when the first FV is within the acceptance window and when the MAC has been verified.

5. The system of claim 4, further comprising the second controller being operative to discard the first message when either the first FV is outside the acceptance window or when the MAC has not been verified.

6. The system of claim 4, further comprising the second controller being operative to:

determine that the first FV is greater than the maximum FV of the acceptance window; and accept the first message when the first FV is greater than the maximum FV of the acceptance window and the MAC has been verified.

7. The system of claim 6, further comprising the second controller being operative to update the acceptance window when the first FV is greater than the maximum FV of the acceptance window and the MAC has been verified.

8. The system of claim 7, wherein the second controller being operative to update the acceptance window comprises the second controller being operative to update the maximum FV of the acceptance window to be equal to the FV term of the received message, and update the minimum FV of the acceptance window based upon the maximum FV and the range of N-bit integers.

9. The system of claim 1, wherein the second controller is operative to verify the MAC; and wherein the second controller is operative to accept the first message when the first FV is within the acceptance window and the MAC has been verified.

10. The system of claim 1, comprising the first controller being in communication with the second controller via one of a direct wired point-to-point link, a networked communication bus link, or a wireless link.

11. The system of claim 1, wherein the N-bit integer generated by the FV manager is monotonically increased.

12. The system of claim 1, wherein the second controller being operative to permit further evaluation of the first message when the first FV is within the acceptance window comprises the second controller being operative to permit further evaluation of the first message when the first FV is greater than the minimum FV.

13. A system for receiving a message, the system comprising:

a second controller, the second controller in communication with a first controller;

the second controller being operative to generate an acceptance window, wherein the acceptance window is defined as a range of N-bit integers between a maximum freshness value (FV) and a minimum FV;

the second controller being operative to receive a first message from the first controller, wherein the first message includes a first FV and a message authenticator (MAC), wherein the first FV is arranged as an N-bit integer that monotonically increases;

the second controller being operative to evaluate the first FV of the first message; and wherein the second controller is operative to permit further evaluation of the first message when the first FV is within the acceptance window; and wherein the second controller is operative to authenticate the first message based upon the MAC and the first FV.

14. The system of claim 13, further comprising the second controller being operative to discard the first message when the first FV is outside the acceptance window.

15. The system of claim 13, further comprising the second controller being operative to discard the first message when the first FV is equal to a previously received FV.

16. The system of claim 13, wherein the second controller is operative to verify the MAC; and wherein the second controller is operative to accept the first message when the first FV is within the acceptance window and when the MAC has been verified.

17. The system of claim 16, further comprising the second controller being operative to discard the first message when either the first FV is outside the acceptance window or when the MAC has not been verified.

18. The system of claim 13, wherein the second controller being operative to permit further evaluation of the first message when the first FV is within the acceptance window comprises the second controller being operative to permit further evaluation of the first message when the first FV is greater than the minimum FV.

19. The system of claim 13, further comprising the second controller being operative to:

determine that the first FV is greater than the maximum FV of the acceptance window;

verify the MAC;

accept the first message when the first FV is greater than the maximum FV of the acceptance window and the MAC has been verified;

update the acceptance window when the first FV is greater than the maximum FV of the acceptance window and the MAC has been verified, including the second controller being operative to update the maximum FV of the acceptance window to be equal to the first FV of the received message, and update the minimum FV of the acceptance window based upon the maximum FV and the range of N-bit integers.

20. A method for transmitting a message, the method comprising:

generating, via freshness value (FV) manager, a first FV, wherein the first FV is arranged as an N-bit integer, and wherein the first FV is readable by a first controller;

generating, via the first controller, a message authenticator (MAC);

generating, via the first controller, a first message, the first message including the first FV and the MAC;

communicating the first message to a second controller;

generating an acceptance window, wherein the acceptance window is defined as a range of N-bit integers between a maximum FV and a minimum FV;

receiving, via the second controller, the first message;

evaluating, via the second controller, the first FV of the first message;

verifying, via the second controller, the MAC;

authenticating, via the second controller, the first message based upon the MAC and the first FV;

accepting the first message when the first FV is within the acceptance window and when the MAC has been verified; and discarding, by the second controller, the first message when either the first FV is outside the acceptance window or when the MAC has not been verified.

\* \* \* \* \*